United States Patent Office 3,162,652
Patented Dec. 22, 1964

3,162,652
SELECTIVE REDUCTION PROCESS
George A. Boswell, Newark, Del., assignor to Shell Oil Company, New York, N.Y., a corporation of Delaware
No Drawing. Filed June 4, 1962, Ser. No. 199,583
6 Claims. (Cl. 260—345.1)

This invention relates to the selective reduction of carbonyl groups in compounds which contain ethylenic double bonds. More particularly, the present invention deals with a process for selectively reducing the aldehyde or ketone group of a compound which contains a vinyl ether group in the molecule and with the selective reductive amination of vinyl ether-substituted aldehydes and ketones. The present invention especially relates to the reduction and/or amination of the carbonyl group in heterocyclic compounds with a vinyl ether linkage in the heterocyclic moiety.

It is known that ether-substituted aldehydes and ketones may be converted to completely saturated ether-substituted alcohols by reduction. In the process of the present invention, the ethylenic double bond of the vinyl ether linkage remains intact.

It is an object of the present invention to provide a convenient method for the selective reduction of the carbonyl group of aldehydes and ketones which contain a vinyl ether group without any appreciable saturation of the ethylenic double bond. A particular object is to provide a method for selective hydrogenation of aldehyde or ketone groups in vinyl ethers to produce the corresponding substituted vinyl ether products. A special object is the production of hydroxy-substituted vinyl ethers from the corresponding carbonyl-substituted vinyl ethers. Another special object is to provide a method for the selective reductive amination of the carbonyl groups of vinyl ether-substituted aldehydes and ketones. Still another special object is to provide a method for the selective reduction and/or amination of dihydropyran compounds without rupturing the ring or saturating the vinyl linkage. Still other objects and advantages of the invention will be apparent from the following description of the process in some of its various modifications.

In the process of the present invention, the carbonyl group of a compound containing a vinyl ether linkage and a carbonyl group is selectively reduced by contacting the compound with hydrogen under pressure in the presence of a hydrogenation catalyst and ammonia or amines. Reductive amination may be accomplished by this method by decreasing the amount of hydrogen present and/or by decreasing the hydrogen pressure in the hydrogenation system. If the amines or ammonia are omitted from the hydrogenation zone, selective reduction is not achieved and the vinyl ether linkage is destroyed by hydrogenation of the double bond. Thus, one of the features of the present invention is that the reduction or reductive amination of the carbonyl group may be conveniently controlled by limiting the hydrogen pressure and the amount of ammonia or amines in the hydrogenation zone relative to the amount of hydrogen. Whether the reaction mixture is composed predominantly of amines or of methylol compounds may be predetermined by selection of the correct reaction conditions. This is most conveniently accomplished by adjusting the ratio of hydrogen to ammonia or amine; a high ratio favors methylolation and a low ratio favors amination. In either case, the presence of ammonia and/or amines in the hydrogenation zone prevents the reduction of the ethylenic double bonds of the vinyl ether linkage. Only an amount sufficient to inhibit hydrogenation of the vinyl ether double bond is necessary. Ordinarily amounts of ammonia and/or amines of from 0.1 mole to 40 moles per mole of carbonyl group to be reduced is sufficient to cause a substantial decrease in the hydrogenation of the vinyl ether double bond. It is preferred to employ an excess of the ammonia or amine based on the carbonyl group of the vinyl ether compound. Mole ratios of from 1 to 30 moles of ammonia or amine per carbonyl group are usually sufficient to prevent any appreciable reduction of the vinyl ether double bond. If amines are to be produced, from 1 to 20 moles of ammonia or amine per mole of the carbonyl-containing vinyl ether compound is sufficient; if methylol compounds are to be produced, generally from 1 to 20 moles of ammonia or amine per mole of carbonyl-containing vinyl ether compound is adequate, but the mole ratio of hydrogen to ammonia or amine should be increased. Pressures may range from 200–600 p.s.i.g. for amine production and from 600 to 2000 p.s.i.g. for methylol production. Some overlap in the pressure range of from 500 to 700 p.s.i.g. produces mixtures of amines and methylol compounds.

To obtain mainly methylol compounds, the mole ratio of hydrogen to ammonia or amine should be increased and this is most conveniently accomplished by increasing the hydrogen pressure without adding further amounts of ammonia or amine. Furthermore, less ammonia or amine per carbonyl group is required when methylol compounds are to be produced. In this case, only an amount of ammonia or amine sufficient to inhibit the hydrogenation of the vinyl ether double bond is required. Usually from 0.1 mole to 10 moles of ammonia or amine per mole of vinyl ether compound is sufficient to inhibit the reduction of the vinyl linkage. The compounds which may be selectively hydrogenated according to the process of the present invention are characterized by the presence of a vinyl ether group and a carbonyl group in the molecule. A vinyl ether group is represented by the formula:

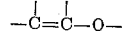

and the carbonyl group by the symbol:

The carbonyl group may be either a ketone or an aldehyde moiety. Thus, the compounds which are selectively hydrogenated may be represented by the general formula:

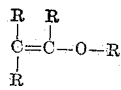

wherein at least one R contains a carbonyl group, and each remaining R group is either hydrogen or an organic group of from 1 to 30 carbon atoms. Suitable organic groups include aldehyde groups, keto groups, carboxyl, cycloaliphatic groups with from 3 to 9 carbon atoms in the ring, alkyl groups with from 1 to 15 carbon atoms, aryl radicals with from 6 to 30 carbon atoms, and alkoxy groups with from 1 to 15 carbon atoms. When R is an alkyl or alkyloxy group, it is preferred that the alkyl moiety contain from 1 to 4 carbon atoms (lower alkyl). Suitable alkyl groups include methyl, ethyl, n-propyl, isopropyl, n-butyl, isobutyl, sec-butyl, tert-butyl and the corresponding alkoxy groups (methoxy, ethoxy, propoxy and butoxy). Any two R groups may be joined to form either a carbocyclic nucleus or a heterocyclic nucleus containing at least one oxygen atom. Thus, the two terminal R groups on the vinyl ether may be joined to form an alkylene chain of from 2 to 8 carbon atoms resulting in terminal cyclopropyl, cyclobutyl, cyclopentyl, cyclohexyl, cycloheptyl, and cyclooctyl rings. Similar unsaturated chains may be joined to form cyclic groups with at least one unsaturation such as cyclobutenyl, cyclopentenyl, cyclohexenyl, cycloheptenyl, and cyclooctenyl terminal cyclic groups. When the R groups on different vinyl carbon atoms are joined, interlineal cyclic groups containing one or more unsaturated bonds are formed. In this case, the combined R groups form divalent carbon chains of from 2 to 6 carbon atoms and result in the formation of unsaturated interlineal carbocyclic rings of from 4 to 8 carbon atoms, the lowest member being a cyclobutene ring and the highest member a cyclooctene ring. When an R group attached to either vinyl carbon is connected to the R group attached to the oxygen atom of the vinyl ether, heterocyclic groups containing an oxygen atom result. This class of compounds includes acrolein thermal dimer (3,4-dihydro-1,2-pyran-2-carboxaldehyde) and substituted acrolein thermal dimers such as the dimer formed from methacrolein (2,5-dimethyl-3,4-dihydro-1,2-pyran-2-carboxaldehyde). Thus, alpha-pyrans and gamma-pyrans containing a substituent with a carbonyl group as well as dihydropyrans containing groups with carbonyl substituents may be selectively hydrogenated according to the process of the present invention.

Vinyl alkyl ethers containing a carbonyl group are particularly suitable for selective reduction according to the present invention. Such compounds are characterized by the formula:

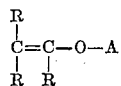

wherein A repesents an alkyl goup of from 1 to 12 carbon atoms (preferably a lower alkyl group of from 1 to 4 carbon atoms such as methyl, ethyl, propyl, and butyl radicals), at least one R group contains a carbonyl group, and each R group is selected from the group consisting of hydrogen and an organic group of from 1 to 30 carbon atoms. Examples of such compounds include formic acid vinyl ester and the polymer represented by the empirical formula $(C_3H_4O_2)_n$ (where $n$ is an integer from 1–500). Other specific examples of compounds containing a vinyl ether linkage and a substituent with a carbonyl group are 4-ethoxy-3-buten-2-one and 4-methoxy-3-methyl-3-buten-2-one. Vinyl ether-substituted aldehydes of from 3 to 12 carbon atoms per molecule can be selectively reduced and/or aminated by the present process.

A particularly suitable subclass or carbonyl-containing vinyl ethers which may be selectively reduced and/or aminated according to the process of the present invention includes substituted or unsubstituted pyrans with a carbonyl group (such as an aldehyde or keto group). Dihydropyrans containing a carbonyl substituent may be conveniently prepared by heating an alpha,beta-unsaturated carbon compound or a mixture of such compounds in the absence of air and water to form the Diels-Alder addition products. For example, 2-aldehydo-2,3-dihydro-gamma-pyran may be prepared by the thermal dimerization of acrolein. Other substituted dihydropyrans may be obtained by heating the corresponding substituted alpha, beta-unsaturated aldehyde, ketone, or mixtures of such compounds. Thus, dihydropyrans with the following structure may be conveniently reduced or animated without affecting the heterocyclic vinyl ether linkage:

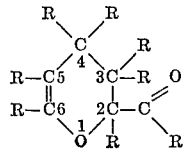

wherein each R is a hydrogen or an organic group of from 1 to 30 carbon atoms. When R is an organic group, R may be an alkyl or alkoxy group of from 1 to 20 carbon atoms, an aryl or aryloxy group of from 6 to 30 carbon atoms, an alkenyl group of from 2 to 20 carbon atoms, or an alicyclic group of from 3 to 9 ring carbon atoms with a total of from 3 to 30 carbon atoms. When R is an alkyl or alkoxy group, lower alkyl and alkoxy groups (from 1 to 4 carbon atoms) are preferred. Examples of such substitutents include methyl, ethyl, n-propyl, isopropyl, n-butyl, isobutyl, sec-butyl and tert-butyl groups, as well as the corresponding lower alkoxy groups. Two or more R groups may be joined to form an external ring system. Thus, benzopyran rings are formed when adjacent R groups with a total of 4 carbon atoms (preferably on the 5- and 6-ring positions) are connected to form a six-membered carbocyclic ring. The external ring may itself be substituted with one or more organic groups with from 1 to 30 carbon atoms. Specific examples of aryl and aryloxy groups include phenyl, benzyl, naphthyl, cumyl, phenethyl and the corresponding oxy groups: phenoxy, benzoxy, naphthoxy, cumoxy, and phenethoxy. Other suitable substituents include vinyl, allyl, butenyl, pentenyl, cyclohexyl, cycloheptyl, cyclopentyl, cyclobutyl, cylopropyl, cyclooctyl, cyclohexenyl, cycloheptenyl, cylopentenyl, cyclobutenyl, and cyclooctenyl.

When the carbonyl group is to be reduced

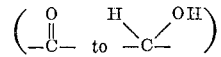

relatively high pressures are employed. For example, in order to convert 2-aldehydo-2,3-dihydro-3,4-dimethyl-gamma-pyran to 2-methylol-2,3-dihydro - 3,4 - dimethyl-gamma-pyran, hydrogen pressures in the range of from 1000–2000 p.s.i.g. are employed at temperatures of from 50–100° C. In order to accomplish this reduction without the destruction of the ethylenic bond of the vinyl ether, from about 1 to 40 moles of ammonia or amine per mole of carbonyl-containing vinyl ether compound is incorporated into the catalytic hydrogenation zone. Any conventional hydrogenattion catalyst may be used. Raney nickel, chrome nickel, platinum, chromium and nickel are all good catalysts. By reducing the hydrogen pressure and increasing the mole ratio of ammonia or amine to carbonyl-containing vinyl ether, it is possible to accomplish the reductive amination of the carbonyl group

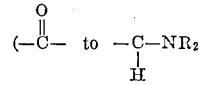

R is hydrogen or an organic group of from 1 to 30 carbon atoms) in a single step. In the reductive amination of the carbonyl group, from 1 to 10 moles (preferably from 2 to 8 moles) of ammonia or amine per mole of carbonyl-containing vinyl ether is sufficient at pressures of from 200 to 600 p.s.i.g. and temperatures of from 60 to 100° C. Thus, when the reductive amination of 2-aldehydo-2,3-dihydro-3,4-dimethyl-gamma-pyran is carried out under these conditions with ammonia, 2-aminomethyl-2,3-dihydro-3,4-dimethyl-gamma-pyran is produced. The preferred temperature and pressure ranges for this embodiment of the process are 70 to 90° C. at pressures of from 300 to 500 p.s.i.g.

The amount of hydrogen used in the process may vary widely. Only an amount sufficient to reduce the carbonyl groups in the molecule of the compound being reduced (or subjected to reductive amination) is necesary. Ordinarily, there is at least one mole of hydrogen per mole of ammonia present when the amount of ammonia employed is at least 10% by weight of the total liquid reaction mixture. The amount of hydrogen per mole of ammonia may vary from 1 to 100 moles of hydrogen per mole of ammonia. Control of the hydrogen pressure is the predominant factor in controlling the ratio of methylol formation to reductive amination in this system. To favor methylol production, the reaction should be performed under conditions wherein the ratio of hydrogen to ammonia is large (from 10 to 1000 moles of hydrogen per mole of ammonia or amine). To favor reductive amination, the mole ratio of hydrogen to ammonia and hydrogen to carbonyl group should be decreased (from 1 to 30 moles of hydrogen per mole of ammonia or amine and from 1 to 30 moles of hydrogen per mole of carbonyl group in the reaction mixture). Thus, if the mole ratio of ammonia or amine to carbonyl group is held constant, but the hydrogen pressure is increased, then methylol production is favored. If the ratio of moles of hydrogen to moles of ammonia or amine is reduced (still keeping the ratio of moles of ammonia or amine to carbonyl group constant), then reductive amination is favored. For any given amount of ammonia or amine in the reaction mixture, the relative amounts of methylol compounds and amine compounds produced may therefore be governed by merely controlling the hydrogen pressure of the reaction mixture. It is believed that these observations reflect the relative rates of ammonia addition to the carbonyl group in the following reactions:

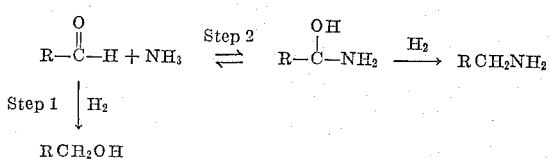

wherein R is an organic group of from 3 to 20 carbon atoms containing a vinyl ether group and preferably a heterocyclic vinyl ether linkage such as a

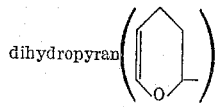

group. When the ratio of the moles of hydrogen per moles of ammonia or amine is great, and the ratio of the moles of hydrogen to the number of carbonyl groups is great, then step 1 takes place faster than step 2, resulting in mainly methylol production. When the mole ratio of hydrogen to ammonia or amine and the mole ratio of hydrogen to the carbonyl group are each reduced, then step 1 is slower than step 2 and reductive amination predominates. The hydrogenation or amination step is usually complete in from 5 minutes to 2 hours, depending somewhat on the reaction conditions and the speed of the hydrogen uptake.

The process of the present invention may be conducted continuously or batch-wise. When the reduction or reductive amination is conducted continuously, it is only necessary to furnish additional amounts of hydrogen and carbonyl-containing vinyl ether compound while continuously removing the reduced products. Additional amounts of catalyst may also be added occasionally to make up for any catalyst losses. If mixtures of amines and methylol compounds are required, the process may be conducted with varying amounts of ammonia or amine mixtures (from 0.5 mole to 40 moles of ammonia, amine, or mixtures thereof per mole of vinyl ether compound). For example, in the reduction of a 3,4-dihydropyran compound containing an aldehyde substituent in the two-position, the reduction may be started at relatively low pressures (200–500 p.s.i.g.) with a 1:1 mole ratio of ammonia to pyran compound to produce predominantly 3,4-dihydropyran-2-methylamine compounds. After about five minutes, additional amounts of pyran and ammonia may be added so that the mole ratio of ammonia to pyran compound is increased to about 10–40 moles (preferably 10–15 moles) of ammonia per mole of pyran. While the mixture of products (amine and methylol derivatives) are withdrawn) the pressure may be raised to 1500 p.s.i.g. over a period of about one hour. At the end of this time interval, the product removed from the hydrogenation zone consists mainly of 3,4-dihydropyran-2-methylol compounds.

In general, ammonia and amine compounds which may be represented by the following formula are incorporated into the hydrogenation zone in order to substantially inhibit or prevent the reduction of the ethylenic bond of the vinyl ether linkage:

$$\begin{array}{c} R \\ | \\ N-R \\ | \\ R \end{array}$$

wherein each R is independently selected from the group consisting of hydrogen and an organic radical of from 1 to 30 carbon atoms. When R is an organic group, R may be a hydrocarbon group of from 1 to 30 carbon atoms.

Suitable R groups include alkyl groups of from 1 to 12 carbon atoms (preferably lower alkyl groups of from 1 to 4 carbon atoms), aryl groups of from 6 to 15 carbon atoms, cycloaliphatic groups of from 3 to 9 carbon atoms, and alkenyl radicals of from 2 to 12 carbons. Specific examples of such compounds include ammonia, tertiary amines such as N,N-dimethylpropylamine, tributylamine, N,N-diphenylbenzylamine, N-propyl-diallylamine, N-dimethyl-stearylamine, dimethyl-1-naphthylamine, triallylamine, secondary amines such as diallylamine, dibutylamine, dihexylamine, N-methyl-ethylamine, N-amyl-octylamine, N-methylcyclohexylamine, and primary amines such as the lower alkyl amines, allylamine, dodecylamine, fluorenamine, phenylamine, naphthylamine, benzylamine, eicosylamine, cyclopentylamine, cyclohexylamine, and cyclohexenylamine. Reductive amination may also be brought about with tertiary amines after disproportionation of these amines under the hydrogenation conditions. Ammonia is the preferred compound for conducting the process of the present invention. The tertiary amines are the least desirable for performing the reductive amination (because of the extra disproportionation step), but are nevertheless suitable for the reduction of the carbonyl group

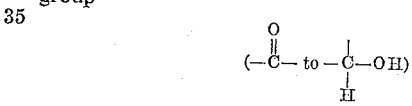

Lower trialkylamines comprise a particular subclass of tertiary amines which may be used to inhibit reduction of the vinyle linkage during the reduction of the carbonyl group.

Mixtures of primary, secondary and tertiary amines containing a dihydropyran ring may be obtained by the addition of mixtures of ammonia, primary amines, secondary amines, and tertiary amines to the carbonyl-containing dihydropyran compound to be reduced in the hydrogenation zone. When the reductive amination is to be carried out in the presence of primary and secondary amines in addition to ammonia, the total moles of ammonia and amines per mole of carbonyl-containing vinyl ether compound should be from 10 to 40 moles of nitrogen compounds per mole of vinyl ether.

It is believed that the presence of ammonia and/or amines in the hydrogenation zone poisons the hydrogenation catalyst so that the ethylenic double bond of the vinyl ether linkage is not reduced. However, the explanation of the selective reduction process of the present invention may be more complex than this because it has been found, for example, that the effect of ammonia on the catalyst is not permanent. To demonstrate this point, a sample of hydrogenation catalyst (Raney nickel) was washed thoroughly with liquid ammonia prior to its use as a hydrogenation catalyst in the attempted reduction of a carbonyl-containing vinyl ether. This was done in order to determine the poisoning effect of the ammonia on the catalyst. In this experiment, the ethylenic linkage of the vinyl ether was completely hydrogenated, indicating that it is the presence of the ammonia or amine in the hydrogenation zone during the reaction, or at least in the vicinity of the catalyst, which promotes the process of the present invention. The action of the ammonia or amines in the present process probably involves an equilibrium between several competing reactions which occur simultaneously in the hydrogenation zone, as explained previously.

The selective reduction process of the present invention may be conducted with or without a solvent. If a solvent is used, hydroxy and polyhydroxy compounds are suitable. For example, the lower alkanols such as methanol, ethanol, n-propanol, isopropanol of n-butanol may be employed as solvents in the process. Inert hydrocarbon solvents such as benzene, xylene, toluene and liquid alkanes may also be used as well as linear or cyclic ethers which are inert under the hydrogenation conditions. Tetrahydrofuran is a particularly good cyclic ether solvent. Linear ethers of the formula R—O—R wherein each R is an alkyl group of from 1–10 carbon atoms (preferably a lower alkyl group of from 1 to 4 carbon atoms) may also be used as a reaction medium or solvent.

The amine compounds of the present invention are useful as curing agents for resins such as the polyepoxy resins. The hydroxy compounds may be epoxidized and polymerized to form useful coating materials. In addition the hydroxy compounds may be used to form esters of organic acids, which may then be converted by epoxidation and/or polymerization to form curable resin compositions.

The following examples are submitted to more fully illustrate the process of the present invention but are not to be construed as limiting the scope of the invention in any way.

EXAMPLE I

*Preparation of Dihydropyran-2-Methanol*

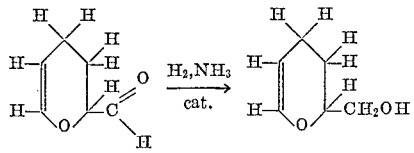

A solution of 283 grams (2.52 moles) of freshly distilled acrolein thermal dimer and 654 grams (10.9 moles) of isopropanol was pumped into a top-stirred one-gallon autoclave which contained 800 grams (47 moles) of ammonia, 100 grams of wet ($H_2O$) Raney nickel (about 50 grams dry weight) and 1500 ml. of isopropanol. The reactor was pressured to 1470 p.s.i.g. with hydrogen. The temperature was held at 80±5° C. When hydrogen consumption ceased, the reactor was drained. Vacuum distillation of the reaction mixture gave 162 grams of clear light yellow liquid, B.P. 86–90° C. at 20 mm. Hg with essentially no bottom product. A portion of the product was lost during the isopropanol stripping. The infrared spectrum of the product was identical with that of dihydropyran-2-methanol. The product was further identified as dihydropyran-2-methanol by gas-liquid chromatographic analysis. The elemental analysis was:

| Analysis | Found, Percent wt. | Calculated for $C_6H_{10}O_2$ |
|---|---|---|
| C | 62.9 | 63.2 |
| H | 9.4 | 8.76 |
| O | 25.7 | 28.10 |
| Unsaturation (Bromine No.), mole/100g | 0.626 | 0.88 |
| Amine, equivalent/100g | 0.007 | 0.0 |

EXAMPLE II

*Preparation of Dihydropyran-2-Methylamine*

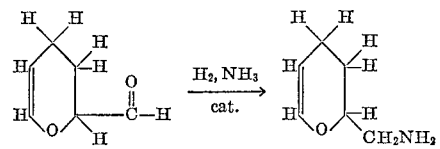

A 430 gram amount of a 33% (wt.) solution of acrolein thermal dimer (1.26 mole of 2-carboxaldehyde 3,4-dihydro-2H-pyran) in isopropanol was slowly pumped into a one-liter horizontally-stirred reactor which contained 20 grams of wet Raney nickel, 100 ml. of isopropanol, and 100 grams (5.9 moles) of ammonia. The temperature was held at 80±5° C. and the reactor pressured with hydrogen to 350–400 p.s.i.g. The charge was pumped into the reactor over a 10-minute period and after an additional fifteen minutes no further hydrogen consumption was observed. The reaction product was distilled. The infrared spectrum of the total crude reaction product showed that the bulk of the vinyl ether function remained intact. Gas-liquid chromatography of the lowest boiling portion of the crude product (boiling point 100° C. at 40 mm. Hg) indicated at least 75% amine and that the alcohol portion was mainly dihydropyran-2-methanol. To obtain a pure sample of the dihydropyran-2-methylamine, 38 grams of the lowest boiling cut was extracted with cold 5% aqueous $H_2SO_4$. The acidic solution was made alkaline with NaOH to spring the amine and extracted with ether. Evaporation of the ether gave 19 grams of crude dihydropyran-2-methylamine (characterized by infrared spectrum). Vacuum distillation of the extracts yielded 11 grams of clear, colorless liquid dihydropyran-2-methylamine, B.P. 90° C. at 20 mm. Hg.

EXAMPLE III

In this example the selective reduction was carried out in the presence of a cyclic ether solvent (tetrahydrofuran).

Four hundred eighty grams of redistilled acrolein dimer was mixed with 1053 grams of tetrahydropyran (31.3% by weight). A 484 gram sample of this solution (containing 1.35 moles of dihydropyran-2-carboxaldehyde) was charged to a reactor with 400 grams (23.5 moles) of ammonia. Raney nickel catalyst washed successively with water, acetone, isopropyl alcohol, and tetrahydrofuran was used. The reactor pressure reached a maximum of about 1750 p.s.i.g. and the temperature was maintained in the range of from 70° C. to 85° C. After hydrogen uptake ceased, the product was removed, drained and allowed to stand at room temperature while the ammonia evaporated. The solution was light brown in color and turned dark red on standing. The major portion of the solvent was removed at atmospheric pressure. The red solution was transferred to a 250 ml. flask and the last traces of tetrahydrofuran solvent were removed at slightly reduced pressure. Vacuum distillation of the residue gave 135 grams of colorless liquid (boiling point 100–107° C. at 43 mm. Hg). The residue after distillation consisted of four grams of red solid. The infrared spectrum of the liquid product was identical with the spectrum of dihydropyran-2-methanol. The yield of dihydropyran-2-methanol based upon the moles of acrolein dimer (dihydropyran-2-carboxaldehyde) charged to the reactor was 89%.

EXAMPLE IV

In order to determine the effect of the ammonia on the hydrogenation catalyst, Raney nickel was washed successively with water, acetone, isopropanol, and liquid ammonia before being placed in the reactor. The ammonia was allowed to evaporate before use. A 430 gram amount of a 34.4% (weight) solution of acrolein thermal dimer in isopropanol was slowly pumped into a one-liter horizontally stirred reactor which contained 40 grams of wet Raney nickel which had been washed with ammonia, 100 ml. of isopropanol, and hydrogen. No ammonia was added to the reactor. The temperature of the reactor was maintained at 70–85° C. and the total hydrogen pressure was maintained at about 350 p.s.i.g. The charge was pumped in over a 15-minute period and a one-hour reaction time was allowed after the charge was all in. The resulting colorless reaction product was vacuum distilled to give 140 grams (94.5%) of tetrahydropyran-2-methanol with a boiling point of 98–103° C. Analysis by gas-liquid chromatography showed the material to be 97% pure. The infrared spectrum of the product showed that no dihydropyran-2-methanol or dihydropyran-2-methylamine was present. The catalyst used in Examples I–III was treated similarly, but was not washed with liquid ammonia.

EXAMPLE V

Example IV was repeated, but instead of pumping acrolein thermal dimer into the reaction zone, all of the ingredients were placed in the reaction zone at one time. Again, no ammonia was added to the reaction zone. Only tetrahydropyran-2-methanol was obtained, indicating complete destruction of the vinyl ether linkage.

I claim as my invention:

1. A method of reducing the carbonyl group of a carbonyl-substituted pyran of the formula

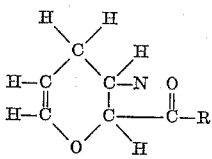

wherein R represents a member of the group consisting of hydrogen, alkyl, and alkoxy of from 1 to 20 carbon atoms, aryl and aryloxy of from 6 to 30 carbon atoms, alkenyl of from 2 to 20 carbon atoms, and alicyclic having 3 to 9 ring carbon atoms and a total of 3 to 30 carbon atoms, which comprises reacting said pyran with hydrogen in the presence of an ammonia compound of the group consisting of ammonia, amines of the formula

wherein each R' is independently selected from the group consisting of hydrogen, alkyl of from 1 to 12 carbon atoms, aryl of from 6 to 15 carbon atoms, cycloaliphatic groups of from 3 to 9 carbon atoms, and alkenyl of from 2 to 12 carbon atoms, and mixtures of ammonia and said amines, using about 1 to about 40 moles of said ammonia compound per mole of said pyran and a pressure of about 600 to about 2000 p.s.i.g. to effect conversion of the carbonyl group of said pyran to carbinol without substantial saturation of the ethylenic double bond of the pyran ring.

2. A method of reducing the carbonyl group of 3,4-dihydro-1,2-pyran-2-carboxaldehyde, which comprises reacting said pyran with hydrogen in the presence of a nickel hydrogenation catalyst and an ammonia compound of the group consisting of ammonia, amines of the formula

wherein each R' is independently selected from the group consisting of hydrogen, alkyl of from 1 to 12 carbon atoms, aryl of from 6 to 15 carbon atoms, cycloaliphatic of from 3 to 9 carbon atoms, and alkenyl of from 2 to 12 carbon atoms, and mixtures of ammonia and said amines, using about 1 to about 40 moles of said ammonia compound per mole of said pyran and a pressure of about 600 to about 2000 p.s.i.g. to effect conversion of the carbonyl group of said pyran to carbinol without substantial saturation of the ethylenic double bond of the pyran ring, and recovering the 3,4-dihydro-1,2-pyran-2-methanol so produced.

3. A method of converting 3,4-dihydro-1,2-pyran-2-carboxaldehyde to the corresponding 3,4-dihydro-1,2-pyran-2-methanol which comprises reacting said 3,4-dihydro-1,2-pyran-2-carboxaldehyde with hydrogen in the presence of a Raney nickel hydrogentation catalyst and ammonia under a pressure of 1000 to 2000 p.s.i.g. at 50° to 100°C. to substantially inhibit the hydrogenation of the double bond in the pyran ring.

4. A process in accordance with claim 3 carried out with 10 to 1000 moles of hydrogen per mole of ammonia and 1 to 30 moles of ammonia per mole of the carboxaldehyde.

5. A method of converting 3,4-dihydro-1,2-pyran-2-carboxaldehyde to the corresponding 3,4-dihydro-1,2-pyran-2-methanol, which comprises reacting said 3,4-dihydro-1,2-pyran-2-carboxaldehyde with hydrogen in the presence of a nickel hydrogenation catalyst and a molar excess of lower alkyl amine at a pressure of 1000 to 2000 p.s.i.g. and a temperature of 50° to 100° C. at which hydrogenation of the aldehyde group to a methanol group is effected without substantial saturation of the double bond of the pyran ring.

6. A method of converting 3,4-dihydro-1,2-pyran-2-carboxaldehyde to the corresponding 3,4-dihydro-1,2-pyran-2-methylamine which comprises reacting said 3,4-dihydro-1,2-pyran-2-carboxaldehyde with hydrogen in the presence of a nickel hydrogenation catalyst and from 1 to 10 moles of ammonia per mole of carboxaldehyde under a pressure of 200 to 600 p.s.i.g. and at a temperature of 60° to 100° C. to substantially suppress the reduction of the ethylenic double bond of the pyran ring.

References Cited by the Examiner
UNITED STATES PATENTS

| | | | |
|---|---|---|---|
| 2,473,497 | 6/49 | Bortnick | 260—345.9 |
| 2,610,193 | 9/52 | Whetstone | 260—345.9 |
| 3,008,964 | 11/61 | Guest et al. | 260—345.1 XR |

IRVING MARCUS, *Primary Examiner.*

NICHOLAS S. RIZZO, WALTER A. MODANCE,
*Examiners.*